(12) United States Patent
Smith

(10) Patent No.: US 7,343,597 B1
(45) Date of Patent: Mar. 11, 2008

(54) METHODS AND APPARATUS FOR COMMUNICATION BETWEEN AN APPLICATION AND A DEVICE

(75) Inventor: Richard J. Smith, San Jose, CA (US)

(73) Assignee: Extreme Networks, Santa Clara, CA (US)

( * ) Notice: Subject to any disclaimer, the term of this patent is extended or adjusted under 35 U.S.C. 154(b) by 690 days.

(21) Appl. No.: 10/317,610

(22) Filed: Dec. 11, 2002

(51) Int. Cl.
*G06F 9/45* (2006.01)
*G06F 15/117* (2006.01)

(52) U.S. Cl. ....................... 717/151; 709/220

(58) Field of Classification Search ......... 709/220–222
See application file for complete search history.

(56) References Cited

U.S. PATENT DOCUMENTS 6,738,781 B1 * 5/2004 Mustoe et al. ............... 707/102
6,954,925 B1 * 10/2005 Kong ........................ 717/143
6,968,553 B1 * 11/2005 Theeten ...................... 719/311

OTHER PUBLICATIONS

Andread Steffen, "Abstract Syntax notation One ASN.1", PowerPoint Slides, 2000-2002.*

"STAR-GATE", 2000 by Comverse Infosys, Inc.*

"PG-FlexPLUS UAP TL1 Command Set Manual", Software Version 0.7.0, May 23, 2000.*

"Information technology—Abstract Syntax Notation One (ASN.1): Specification of basic notation, ITU-T Recommendation X.680ITU-T Recommendation X.680", Jul. 2002.*

Brad Couch, "Process flow-through for service provisioning-an implementationprogress report", Network Operations and Management Symposium, 1998. NOMS 98., IEEE vol. 1, Issue , Feb. 15-20, 1998 pp. 49-59 vol. 1 Digital Object Identifier 10.1109/NOMS.1998.654841.*

* cited by examiner

*Primary Examiner*—Wei Zhen
*Assistant Examiner*—Philip Wang
(74) *Attorney, Agent, or Firm*—Blakely Sokoloff Taylor and Zafman

(57) ABSTRACT

Methods and apparatus for communication between an application and a device. In one embodiment, a set of class mappings maps parameters between a parser and an application data model. The parser is reversible, and the parser can be used to both parse a received command and reconstruct a command.

24 Claims, 13 Drawing Sheets

```
801 | | ParseChoiceNode:
802 | | | ParseNodeList:                                    800
803 | | | ParseTokenNode: token(enable) (paramName=_boolean)
804 | | | | ParseChoiceNode:
805 | | | | | ParseNodeList:
806 | | | | | | ParseTokenNode: token(multinetting) *
807 | | | | | ParseNodeList:
808 | | | | | | ParseTokenNode: token(tacacs-accounting) *
809 | | | | | ParseNodeList:
810 | | | | | | ParseTokenNode: token(telnet) *
811 | | | | | | ParseChoiceNode:
812 | | | | | | | ParseNodeList:
813 | | | | | | | | ParseTokenNode: token(access-profile)
814 | | | | | | | | ParseChoiceNode:
815 | | | | | | | | | ParseNodeList:
816 | | | | | | | | | | ParseTokenNode: token(none) *
817 | | | | | | | | | ParseNodeList:
818 | | | | | | | | | | ParseTokenNode: token(<name>) (paramName=_telnetAccessProfile) *
819 | | | | | | | | ParseChoiceNode:
820 | | | | | | | | | ParseNodeList:
821 | | | | | | | | | | <empty>
822 | | | | | | | | | ParseNodeList:
823 | | | | | | | | | | ParseTokenNode: token(port)
824 | | | | | | | | | | ParseTokenNode: token(<unsigned>) (paramName=_telnetPort) *
825 | | | | | | ParseNodeList:
826 | | | | | | | <empty>
827 | | | | ParseNodeList:
```

FIG. 8

```
         901   902      903       904  905 906
        ⌣     ⌣        ⌣         ⌣   ⌣   ⌣
        enable telnet access-profile foo port 23
```
                                                    900

1001    _boolean=enable
1002    _telnetAccessProfile=foo
1003    _telnetPort=23

FIG. 10

```
| | | ParseNodeList:
| | | ParseTokenNode: token(configure)
| | | ParseChoiceNode:
          ⋮

| | | | | ParseNodeList:
| | | | | | ParseTokenNode: token(vlan)
| | | | | | ParseTokenNode: token(<name>) (paramName=_label)
| | | | | | ParseChoiceNode:
              ⋮

| | | | | | | ParseNodeList:
| | | | | | | | ParseTokenNode: token(tag)
| | | | | | | | ParseTokenNode: token(<unsigned>) (paramName=_vlanTag) *
                  ⋮

| | | | | | | ParseNodeList:
| | | | | | | | ParseTokenNode: token(add) (paramName=ad)
| | | | | | | | ParseChoiceNode:
                  ⋮

| | | | | | | | | ParseNodeList:
| | | | | | | | | | ParseTokenNode: token(ports)
| | | | | | | | | | ParseTokenNode: token(<portmask>) (paramName=_ports) *
| | | | | | | | | | ParseChoiceNode:
| | | | | | | | | | | ParseNodeList:
| | | | | | | | | | | | ParseTokenNode: token(tagged) (paramName=_taggedInVLAN) *
| | | | | | | | | | | ParseNodeList:
| | | | | | | | | | | | ParseTokenNode: token(untagged) (paramName=_taggedInVLAN) *
| | | | | | | | | | | ParseNodeList:
| | | | | | | | | | | | <empty>
| | | | | | | | | | ParseChoiceNode:
```

METHODS AND APPARATUS FOR COMMUNICATION BETWEEN AN APPLICATION AND A DEVICE

FIELD OF THE INVENTION

The disclosed embodiments relate generally to the field of computer systems and, in particular, the disclosed embodiments relate to methods and apparatus for communication between an application and a device.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Extreme Networks, All Rights Reserved.

BACKGROUND OF THE INVENTION

Many electronic devices include embedded software and/or firmware that controls the device's functions and operation. Generally, this device level software or firmware is capable of generating and/or receiving commands that have a specified format and syntax and/or that are written in a particular programming language. It is often desirable, however, to control such an electronic device using a different application running on a separate computer system or on the device itself. For example, in computer networks, networking devices such as switches and routers are routinely controlled by network management applications resident on a server or other computer system. Management functions performed by the network management application include status monitoring (e.g., port status), device configuration, device installation and removal, etc.

To interface an application with the embedded software and/or firmware of an electronic device, the application and device need to be able to communicate with one another (e.g., exchange commands and other data). However, the application and device may use differing syntax, format, programming languages and/or data models. Thus, the exchange of commands and other communications between the device and application generally requires that a communication (e.g., a command) be manipulated, such that the receiving entity can interpret the communication. Returning to the networking example above, network switches typically have a suite of configuration commands understood by the switch's embedded software/firmware and that are used to configure and control operation of the switch. In order for the network management application to both provide commands to the switch and receive commands from the switch (e.g., for displaying configuration information to a user), the commands are reformatted or otherwise converted into a syntax that can be interpreted by the receiving entity (i.e., either the switch or the network management application).

Command parsers, whose function is to parse or separate a command (or other communication) into one or more meaningful parameters or data strings, are known in the art, and these conventional parsers have been used in the translation of command lines during the exchange of communications between an application and a device. However, translation schemes using such parsers are inefficient and exhibit a number of disadvantages. For example, when transmitting commands from an application (e.g., a network management application) to a device (e.g., a network switch), a large amount of hand-written code was necessary to translate the output of the parser into a form consistent with that of the application's data model. Furthermore, the types of configuration operations that could be performed by the application was severely restricted. Typically, only a small, well-defined set of operations could be performed by the application, and each of these operations required hand-written code specific to that operation, again resulting in a large quantity of hand-written code. Because of the vast amount of hand-written code necessary to translate commands and other communications using conventional parsers, prior art methods for manipulating these communications were error prone. For example, there was a high probability of generating incorrect command strings if the destination device is in an unanticipated state, and coding errors were also common.

SUMMARY OF THE INVENTION

In one embodiment, a command is received. A parse tree is accessed, and this parse tree has the property that only a single path through the parse tree corresponds to the received command. The received command is then parsed to identify this single path in the parse tree.

In another embodiment, a command is received. A first choice node of a parse tree is accessed, wherein a number of first node lists are associated with this first choice node. If a string of the received command matches a search string of a token node in one of the first node lists, the command string and a parameter name of the matching token node are added to a parameter map. The first node list corresponding to the matching token node is then accessed.

In a further embodiment, a parameter map is provided. A parse tree is searched to identify a number of possible paths through the parse tree, each of the possible paths corresponding to the parameter map. One of the possible paths is selected and, using the selected path and a command template, a command is reconstructed.

In yet another embodiment, a parameter map is provided. A parse tree is searched to identify all paths corresponding to the parameter map, wherein each path represents a command string. Those command strings that include a required parameter are selected.

In yet a further embodiment, an apparatus includes a processing device that is coupled with a memory. An agent is stored in the memory. When the agent is executed by the processing device, the agent provides an application data model having a number of data classes. The agent also provides a reversible parser that can parse a received command into a number of parameters and that can reconstruct the command from the number of parameters. Further, the agent provides a number of class mappings. Each of the class mappings provides a mapping between the reversible parser and one of the data classes in the application data model.

In another embodiment, a first application data model is provided and a second application data model is provided. The first application data model is altered into a form identical to the second application data model. A number of commands are then generated based on the alteration of the first application data model.

BRIEF DESCRIPTION OF THE DRAWINGS

FIG. 8 shows an example of a parse tree (or a portion of a parse tree).

FIG. 9 shows an example of a command that may be parsed using the parse tree of FIG. 8.

FIG. 10 shows a parameter map created by parsing the command shown in

FIG. 12 shows an example of a rule set including a number of rules.

FIGS. 13A-C show another example of a parse tree (or portions of a parse tree).

DETAILED DESCRIPTION OF THE INVENTION

Embodiments of methods and apparatus for communication exchange between an application and a device are disclosed herein. For ease of understanding, the disclosed embodiments are presented below in the context of a computer network. It should be understood, however, that the disclosed embodiments are not limited in application to a networking environment and, further, that the embodiments described herein may be used in a variety of applications where commands and other communications are exchanged between an application and a device.

Figure 1:
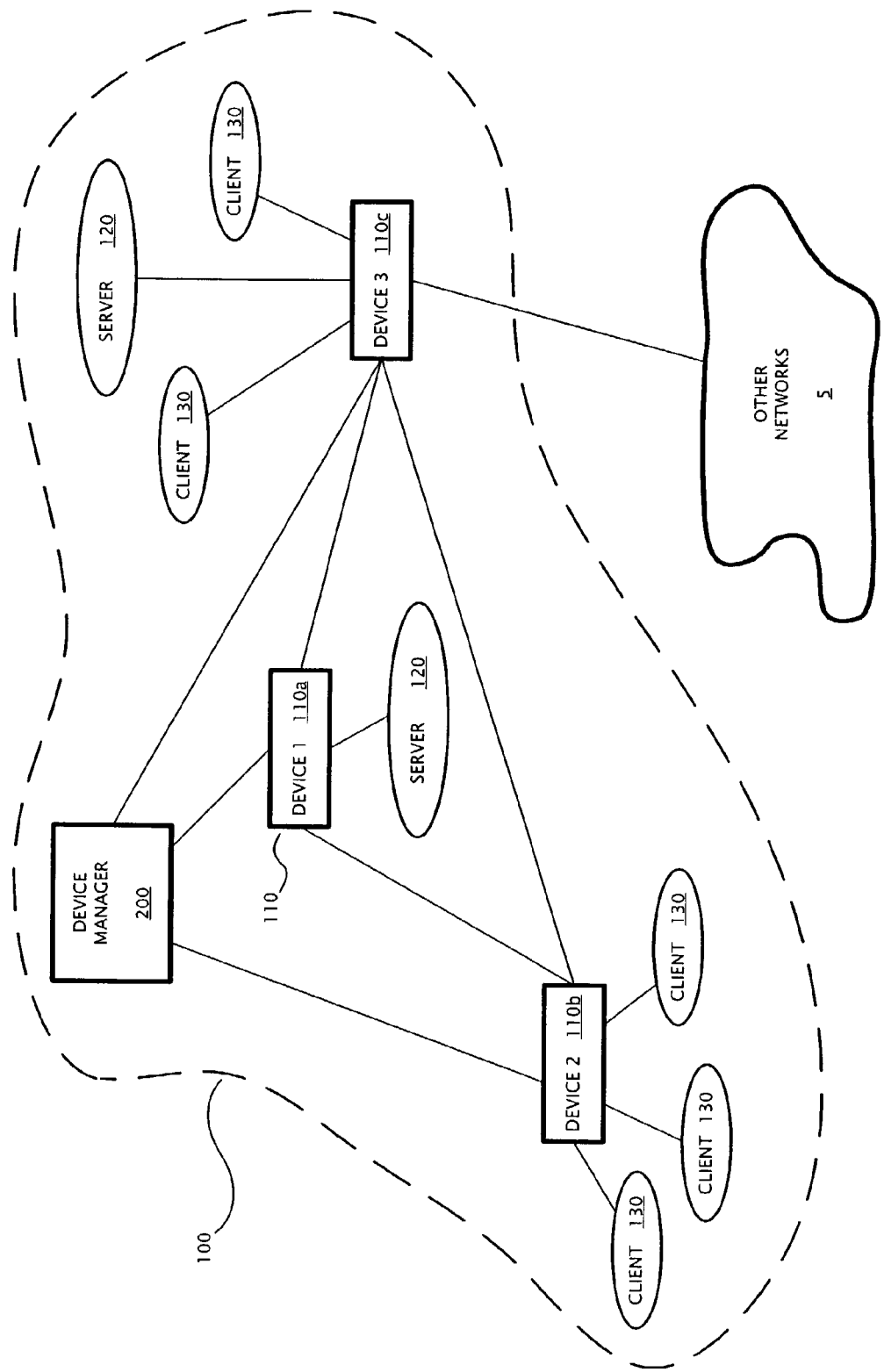
FIG. 1 is a schematic diagram illustrating an embodiment of a network having a device manager.

Illustrated in FIG. 1 is an embodiment of a network 100. The network 100 comprises a number of interconnected devices 110, including devices 110a, 110b, 110c. Each of the devices 110a-c may comprises a switch, router, or other networking device. A device manager 200 is coupled with each of the devices 110a-c. As will be explained in greater detail below, the device manager 200 can monitor the devices 110a-c and perform other management functions with respect to these devices 110.

The devices 110a-c are each coupled with one or more network components. By way of example, the device 110a (DEVICE 1) is coupled with a server 120, the device 110b (DEVICE 2) is coupled with a number of client computer systems 130, whereas the device 110c (DEVICE 3) is coupled with a server 120 and a number of client computer systems 130. The network 100—which may comprise a Local Area Network (LAN), a Metropolitan Area Network (MAN), a Wide Area Network (WAN), or other type of network—is also coupled via device 110c with one or more other networks 5 (e.g., the Internet or another LAN, MAN, or WAN).

It should be understood that the network 100 is intended to represent an exemplary embodiment of a network and, further, that the network 100 may have any suitable configuration. For example, the network 100 may comprise any suitable number of devices 110 (e.g., switches, routers, etc.), servers 120, and client computer systems 130. The network 100 may include additional devices 110, severs 120, and client computer systems 130, or the network 100 may not includes all of the components shown in FIG. 1. Also, more than one of the devices 110a-c may be coupled with other networks 5.

Figure 2:
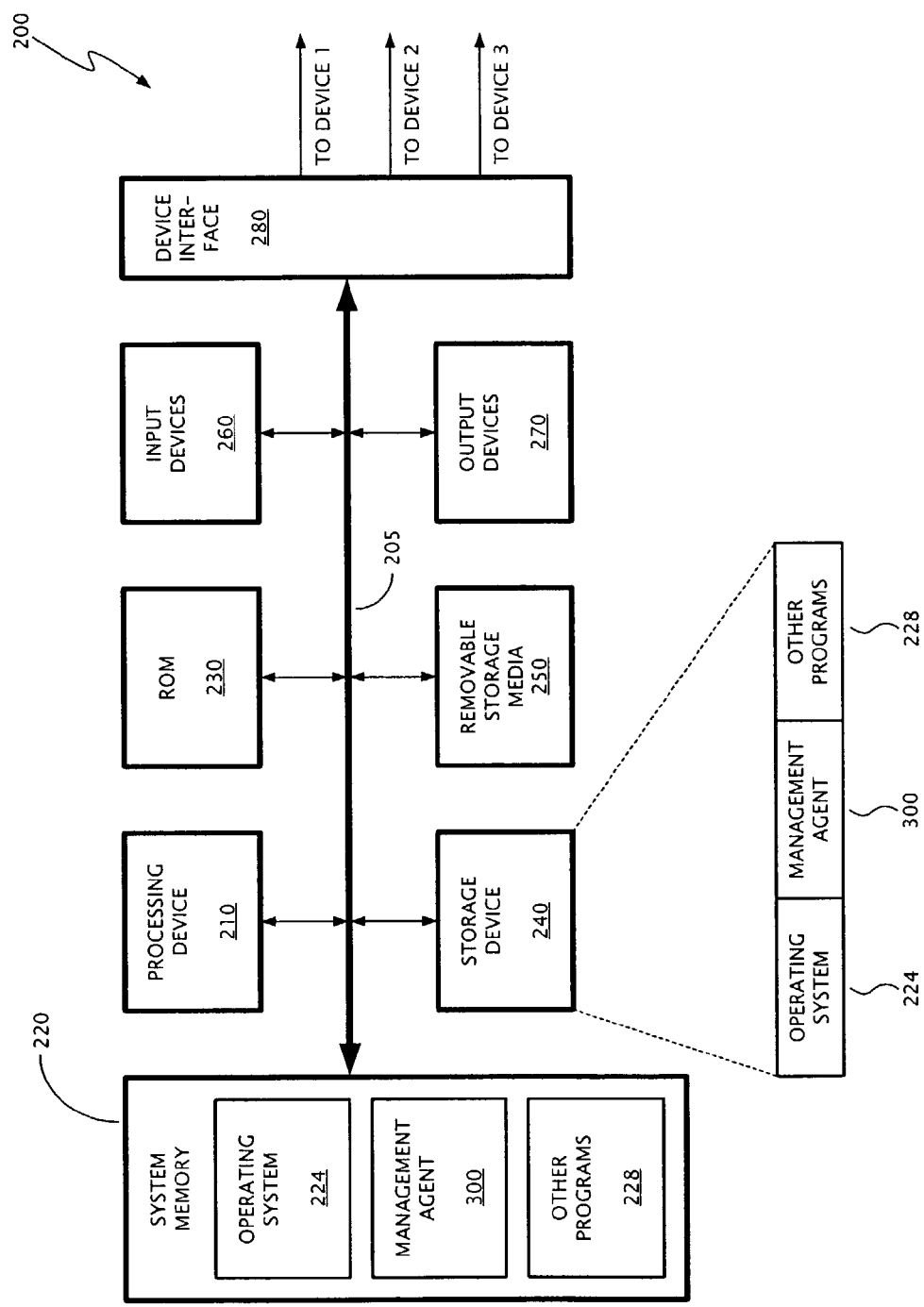
FIG. 2 is a schematic diagram illustrating an embodiment of the device manager of FIG. 1, the device manager including a management agent.

The device manager 200 comprises any suitable device capable of interfacing with each of the devices 110a-c, such that the device manager can receive commands and other communications from the devices 110a-c, as well as provide such communications to the devices 110a-c. In one embodiment, the device manager 200 comprises a computer system upon which a management agent 300 may be run. An embodiment of such a device manager 200 is illustrated in FIG. 2. As will be explained in more detail below, the management agent 300 comprises a software application that is capable of communicating with the devices 110a-c, and the management agent 300 may perform management functions (e.g., device configuration, status monitoring, adding/deleting devices, and the like).

Referring to FIG. 2, the device manager 200 includes a bus 205 having a processing device (or devices) 210 coupled therewith. Device manager 200 also includes system memory 220 coupled with bus 205, the system memory 220 comprising, for example, any suitable type of random access memory (RAM). During operation of device manager 200, an operating system 224, the management agent 300, as well as other programs 228 may be resident in the system memory 220. The device manager 200 may further include a read-only memory (ROM) 230 coupled with the bus 205. During operation, the ROM 230 may store temporary instructions and variables for processing device 210, and ROM 230 may also have resident thereon a system BIOS (Basic Input/Output System).

Device manager 200 may also include a storage device 240 coupled with the bus 205. The storage device 240 comprises any suitable non-volatile memory, such as, for example, a hard disk drive. The management agent 300, as well as operating system 224 and other programs 228, may be stored in the storage device 240. Further, a device 250 for accessing removable storage media—e.g., a floppy disk drive or a CD ROM drive—may be coupled with bus 205. The device manager 200 may include one or more input devices 260 coupled with the bus 205. Common input devices 260 include keyboards, pointing devices such as a mouse, and scanners or other data entry devices. One or more output devices 270 may also be coupled with the bus 205. Common output devices 270 include video monitors, printing devices, and audio output devices (e.g., a sound card and speakers).

The device manager 200 further comprises a device interface 280 coupled with bus 205. Device interface 280 comprises any suitable hardware, software, or combination of hardware and software capable of coupling the device manager 200 with each of the devices 110a-c of network 100, thereby allowing the device manager 200 and, in particular, management agent 300—to communicate with each of the devices 110a-c. Accordingly, the management agent 300 can send communications to, as well as receive communications from, the devices 110a-c.

It should be understood that the device manager 200 illustrated in FIG. 2 is intended to represent an exemplary embodiment of such a computer system and, further, that the device manager 200 may include many additional components, which have been omitted for clarity and ease of understanding. By way of example, the device manager 200 may include a DMA (direct memory access) controller, a chip set associated with the processing device 210, additional memory (e.g., a cache memory), as well as additional signal lines and buses. Also, it should be understood that the device manager 200 may not include all of the components shown in FIG. 2.

Figure 3:
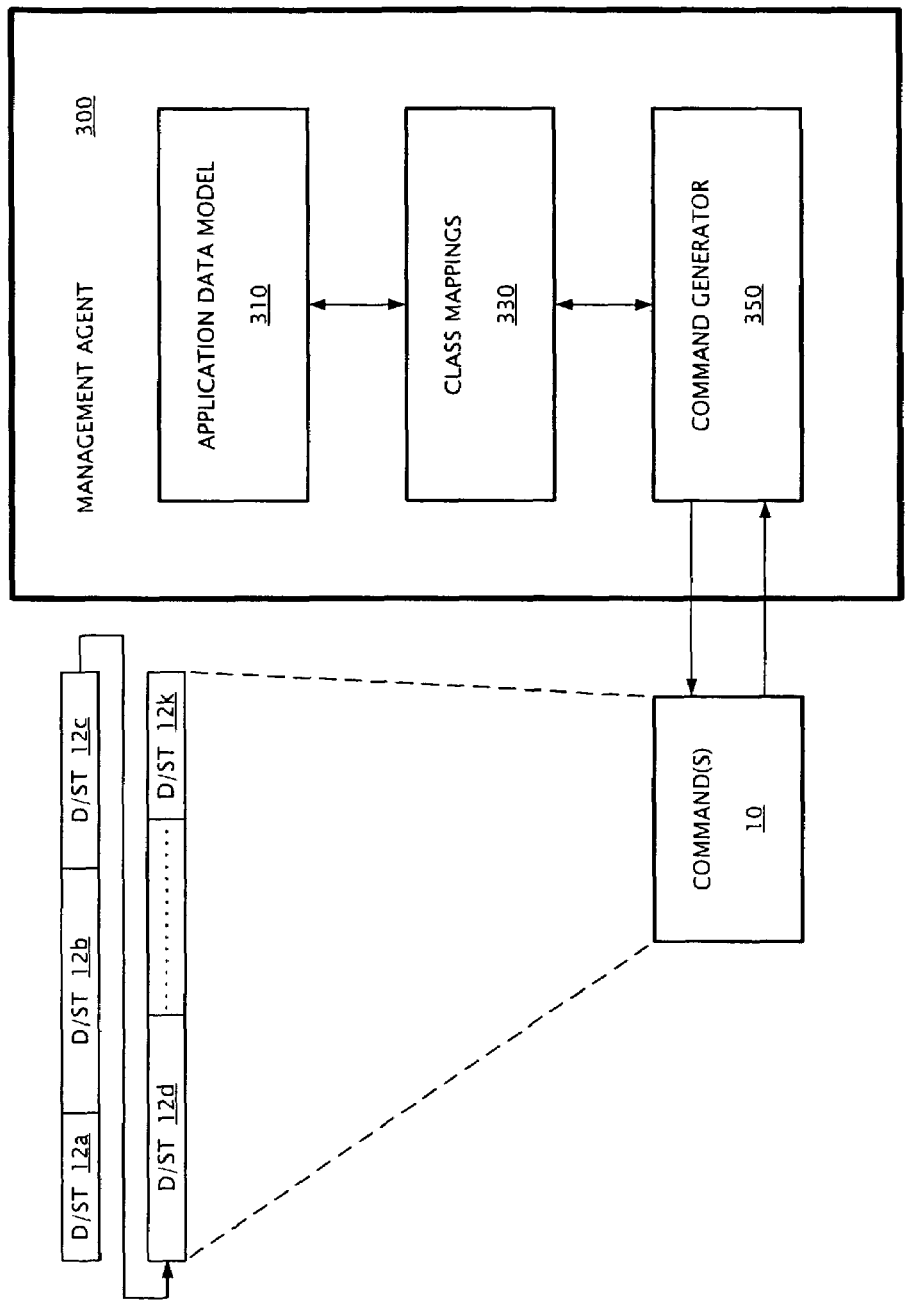
FIG. 3 is a schematic diagram illustrating an embodiment of the management agent of FIG. 2.

Illustrated in FIG. 3 is an embodiment of management agent 300. In one embodiment, the management agent 300 comprises a set of instructions—i.e., a software application—run on device manager 200 (or other computer system). The set of instructions may be stored locally in storage device 240 or, alternatively, the instructions may be stored in a remote storage device (not shown in figures) and accessed via network 100. During operation, the set of instructions may be executed on processing device 210, wherein the instructions (or a portion thereof) may be resident in system memory 220. In another embodiment, the management agent 300 comprises a set of instructions stored on a machine accessible medium, such as, for example, a magnetic media (e.g., a floppy disk or magnetic tape), an optically accessible disk (e.g., a CD-ROM disk), a flash memory device, etc. To run management agent 300 on device manager 200, the device 250 for accessing removable storage media may access the instructions on the machine accessible medium, and the instructions may then be executed in processing device 210. In this embodiment, the instructions (or a portion thereof) may again be downloaded to system memory 220.

In yet a further embodiment, the management agent 300 is implemented in hardware or a combination of hardware and software (e.g., firmware). For example, the management agent 300 may be implemented in an ASIC (Application Specific Integrated Circuit), FPGA (Field Programmable Gate Array), or other similar device that has been programmed in accordance with the disclosed embodiments.

For any of the above-described embodiments of management agent 300, the set of instructions may be written in an object-oriented programming language, such as Java or C++. However, although some aspects of the disclosed embodiments are described in the context of an object-oriented programming system, it should be understood that the management agent 300 may be implemented in a variety of programming languages.

Referring now to FIG. 3, the management agent 300 comprises an application data model 310, class mappings 330, and a command generator 350. The management agent 300 can receive commands 10 (or other communications) from the devices 110a-c (see FIG. 1). As used herein, the term "command" should be interpreted broadly to encompass a command or any other type of communication between the management agent 300 and a device 110. Each command 10 comprises one or more data strings (D/ST) 12—including data strings 12a, 12b, . . . , 12k—wherein at least some of the data strings 12a-k correspond to parameters of interest (e.g., a parameter representing a keyword, identifier, number, or other variable associated with the command). For ease of understanding, the disclosed embodiments are described below in the context of the exchange of commands (e.g., configuration commands) between the management agent 300 and one or more of the devices 110. However, it should be understood that the disclosed embodiments are applicable to the exchange of any communications between management agent 300 and devices 110.

The command generator 350 can extract from command 10 the data strings 12 corresponding to certain parameters to create a parameter map. The class mappings 330 provide an interface between the command generator 350 and the application data model 310, such that these command parameters can be received and interpreted by the application data model 310. The application data model 310 comprises a set of data classes that define the framework by which the management agent 300 can describe, annotate, and store data. The above-described process is also reversible. When the management agent 300 manipulates application data to create (or resulting in) a command, data from application data model 310 can be provided to command generator 350 via the class mappings 330, and the command generator 350 translates the application data into a command (e.g., a configuration command) that can be understood by the devices 110. Each of the application data model 310, class mappings 330, and command generator 350 is described in greater detail below.

Figure 4:
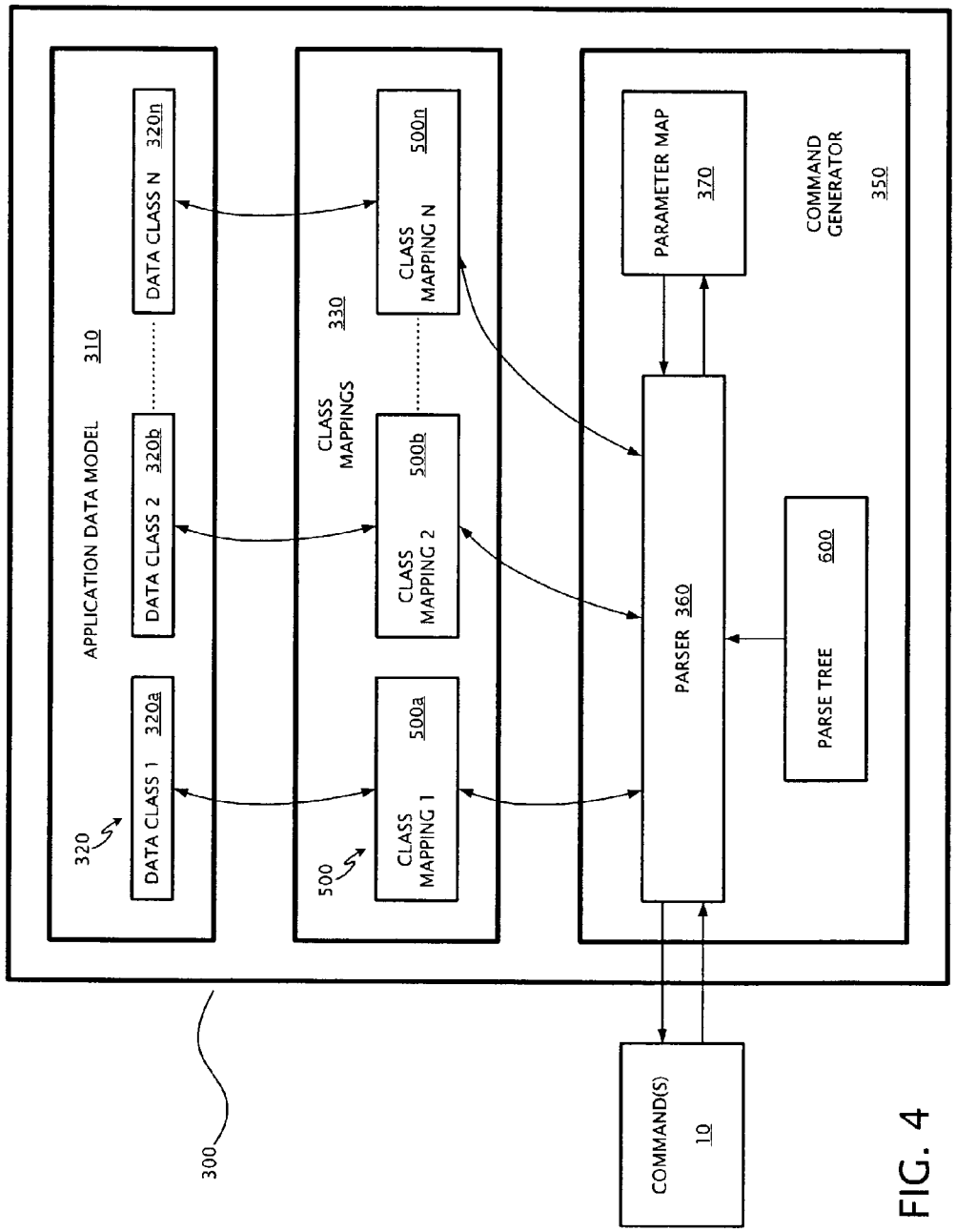
FIG. 4 is a schematic diagram illustrating an embodiment of the management agent shown in FIG. 3.

Referring to FIG. 4, the elements of management agent 300 are illustrated in greater detail. The application data model 310 includes a number of data classes 320, including data classes 320a (DATA CLASS 1), 320b (DATA CLASS 2), . . . , 320n (DATA CLASS N). Each data class 320a-n represents related data types (or, in an object-oriented programming scheme, related objects or instances of an object).

The command generator 350 comprises a reversible parser 360 and a parse tree 600. Using the parse tree 600, the parser 360 can parse a received command 10 to create a parameter map 370 that can be provided to the application data model 310. A parameter map 370 comprises a list of parameter names that were encountered during the parse operation and, for each parameter name, the value or data string corresponding to that parameter name. The parser 360 is, however, reversible. Provided with a map of parameters from application data model 310, as well as some additional information, the parser 360 can generate commands 10 for devices 110. Operation of the parser 360 and parse tree 600 is explained in greater detail below.

Class mappings 330 comprises a number of class mappings 500, including class mappings 500a (CLASS MAPPING 1), 500b (CLASS MAPPING 2), . . . , 500n (CLASS MAPPING N). Each of the class mappings 500a-n corresponds to one of the data classes 320a-n (e.g., class mapping 500a corresponds to data class 320a, and so on), and each class mapping 500 defines a mapping between data in it's corresponding data class 320 and the parser 360. Thus, commands 10 can be received from a device 110, parsed to identify the pertinent parameters, and these parameters mapped into the application data model 310 (e.g., as object instances and attribute values), such that the management agent 300 can interpret the command 10. Further, data from the application data model 310 can be mapped to the command generator 350 and a command 10 having the appropriate syntax constructed for transmission from management agent 300 to a device 110.

Figure 5:
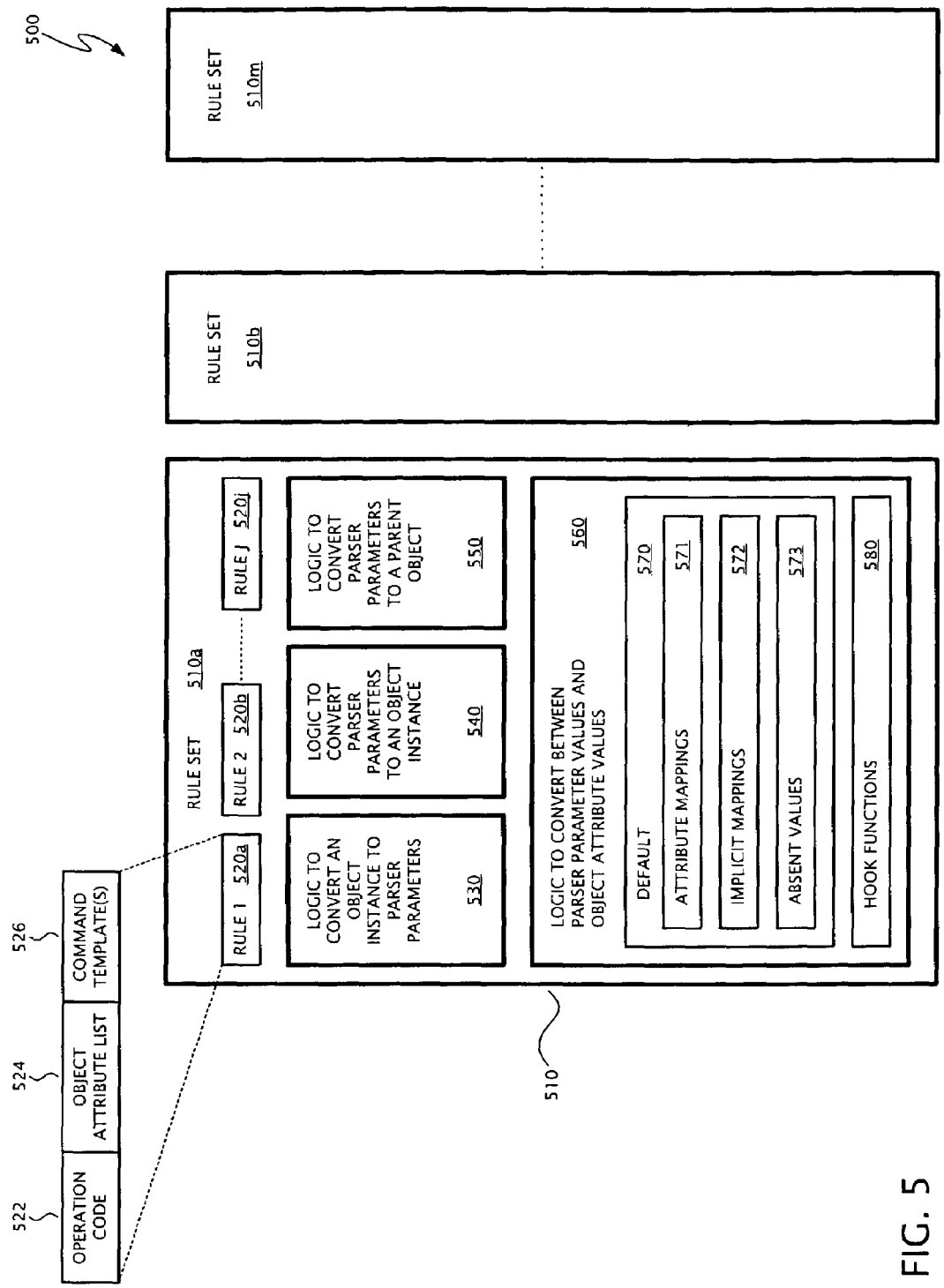
FIG. 5 is a schematic diagram illustrating an embodiment of a class mapping.

Shown in FIG. 5 is one embodiment of a class mapping 500 corresponding to one of the data classes 320 of application data model 310. The class mapping 500 comprises a number of rule sets 510, including rule sets 510a, 510b, . . . , 510m. In FIG. 5, the rule set 510a is illustrated in greater detail, and it should be understood that each of the rules sets 510b-m may includes elements similar to those shown for rule set 510a.

Referring to rule set 510a in FIG. 5, a rule set 510 includes a number of rules 520, including rules 520a (RULE 1), 520b (RULE 2), . . . , 520j (RULE J). Each rule 520 maps a command to an object manipulation (e.g., create an object, delete an object, modify attributes of an object, associate an object with a relationship, and dissociate an object from a relationship). This mapping is reversible; manipulations of application data (e.g., one of the five above-described operations) can be mapped by a rule 520 to a command.

A rule 520 may comprise an operation code 522, an attribute list 524, and a command template (or templates) 526. The operation code 522 may comprise "create object", "delete object", "update object", "associate object", or "dissociate object". The attribute list 524 comprises a list of attributes that are to be mapped to a command. A command template 526 comprises a template that can be used to construct a command in the appropriate syntax (e.g., a syntax understood by the devices 110). Generally, a command template comprises a sequence of "token nodes" that a generated command should contain and, further, the command template suggests a path through parse tree 600 beginning from a "root node." The parse tree 600 and it's use in reconstructing commands is explained in greater detail below.

The rule set 510a of FIG. 5 also includes logic 530 to convert an object instance to one or more parser parameters, logic 540 to convert parser parameters to an object instance, and logic 550 to convert parser parameters to a parent object (e.g., a parent to the object created by logic 540). By way of example, the logic 530 may convert a VLAN (Virtual LAN) object to a name of the VLAN, this parser parameter represented by a string corresponding to the VLAN's name. Continuing with this example, the logic 540 may take a string representing the name of a VLAN and convert that string to a VLAN object by searching the application data model 310 for a VLAN object having a name matching the string. The logic 550 would then return the parent object to the VLAN object identified by logic 540, which in this example may be the VLAN's folder. The logic 550 for providing the parent object is typically used for create object operations, such that the parent under which to create the new child object can be identified. For other operations, the specified object will generally be pre-existing.

As shown in FIG. 5, a rule set 510 may also include logic 560 to convert parser parameter values to object attribute values and to convert object attribute values to parser parameter values. Generally, parser parameter values (i.e., values parsed from a command 10 by parser 360) comprise strings and integers, whereas object attribute values may comprise strings, integers, references to other objects, Booleans, as well as others. Any combination of parser parameters can be converted by logic 560 to any combination of attribute values; however, in many instances, each parser parameter will be associated with one attribute value. In addition to converting values, the logic 560 may also perform a name conversion if a parser parameter has a different name than the corresponding attribute to which it maps.

The logic 560 to convert between parser parameter values and object attribute values may comprise default logic 570 and hook functions 580. As will be explained in more detail below, if the mapping between parser parameter values and object attribute values provided by default logic 570 is insufficient, the hook functions 580 can be overridden to provide a customized mapping behavior for the data class 320 corresponding to this class mapping 500.

The default logic 570 may include attribute mappings 571, implicit mappings 572, and absent values 573. Generally, an attribute mapping 571 translates a parser parameter value into an object attribute value and back again. Examples of attribute mappings 571 include converting a string value (e.g., a name, keyword, etc.) parsed from a command into an enumerated integer value (i.e., enumerated integers specific to management agent 300), converting a string value (e.g., a name, keyword, etc.) parsed from a command into a reference to the application object corresponding to that string, converting a parsed string value representing a name into a different attribute name, and converting a string value parsed from a command into a Boolean true or false.

Generally, the default behavior is to locate the appropriate attribute mapping 571 for a specified parser parameter value or object attribute value and perform that attribute mapping. However, there may be instances where no attribute mapping exists for a given parser parameter value or object attribute value. If there is no attribute mapping, an implicit mapping 572 will pass the value (either parser parameter or object attribute) through the class mapping 500 without modification. The implicit mapping 572 assumes the parser parameter name and object attribute name are the same.

The default logic 570 may also define one or more absent values 573. An absent value 573 specifies a default object attribute value for which the parser parameter value can be omitted. When generating a command, an absent value 573 may be used to omit unnecessary parser parameters in the generated command. When receiving a command, an absent value 573 may be used to insert a default object attribute value for an unspecified parameter value. For example, consider the string "tag _tag=<number>". The absent value for "_tag" is the integer value zero (0). Thus, if the optional "_tag=<number>" clause is omitted, the attribute "_tag" will be set to a value of zero (0).

If the above-described default conversion process provided by default logic 570 is not sufficient, then the author of the class mapping 500 can override one or more of the hook functions 580 to provide a customized conversion between parser parameter values and object attribute values. By way of example, a customized conversion process may be needed where multiple parser parameter values map to a single object attribute value.

As noted above, the command generator 350 of management agent 300 includes a reversible parser 360 and a parse tree 600 (see FIG. 4). Using this parse tree 600, the parser 360 can parse a command 10 to create a parameter map 370 and, having been provided with a parameter map 370 plus some additional information, the parser 360 can generate a command. An embodiment of the parse tree 600 is illustrated in FIG. 6, and a method 700 of parsing a command is shown in FIG. 7.

Figure 6:
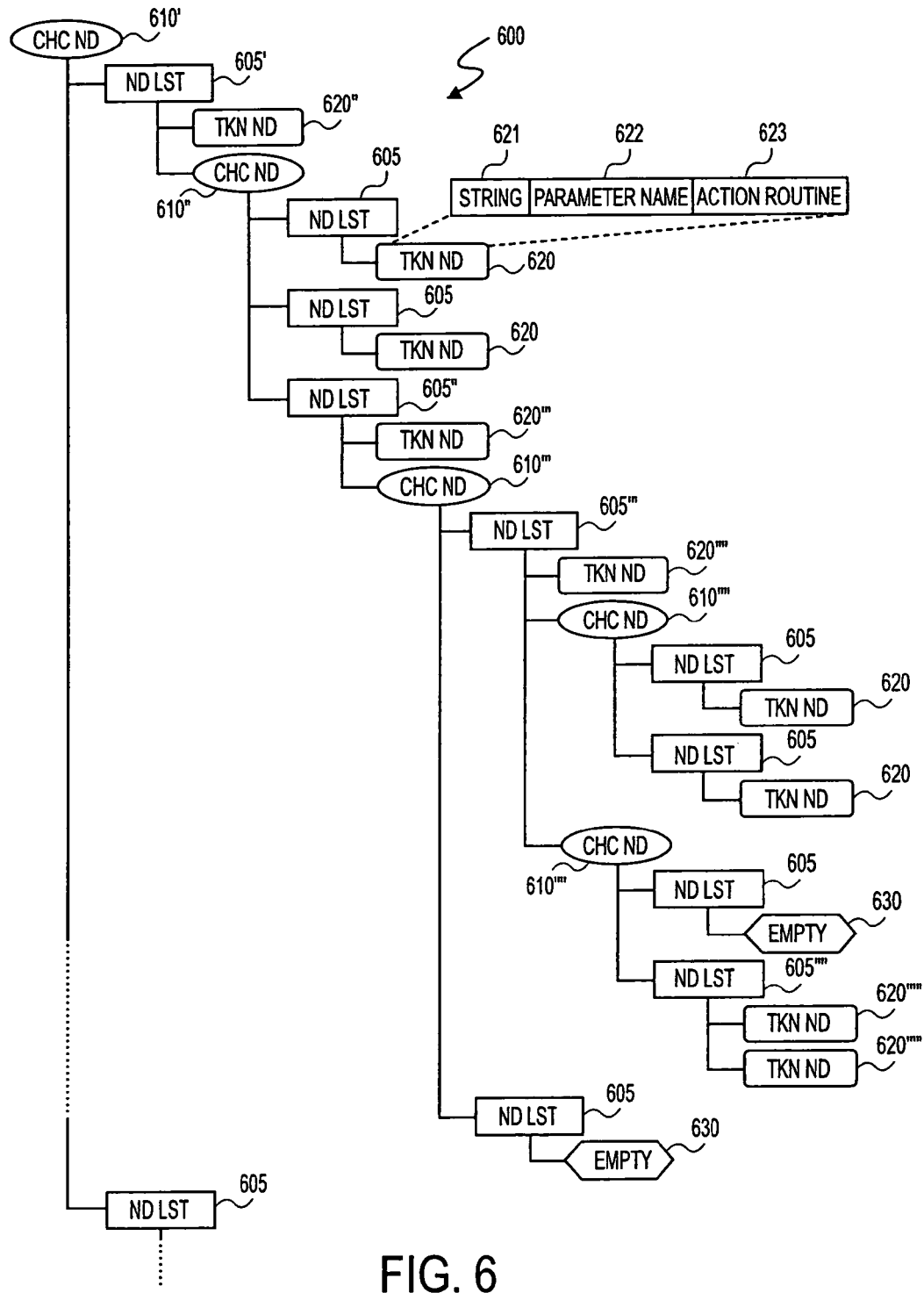
FIG. 6 is a schematic diagram illustrating an embodiment of the parse tree.
Figure 7:
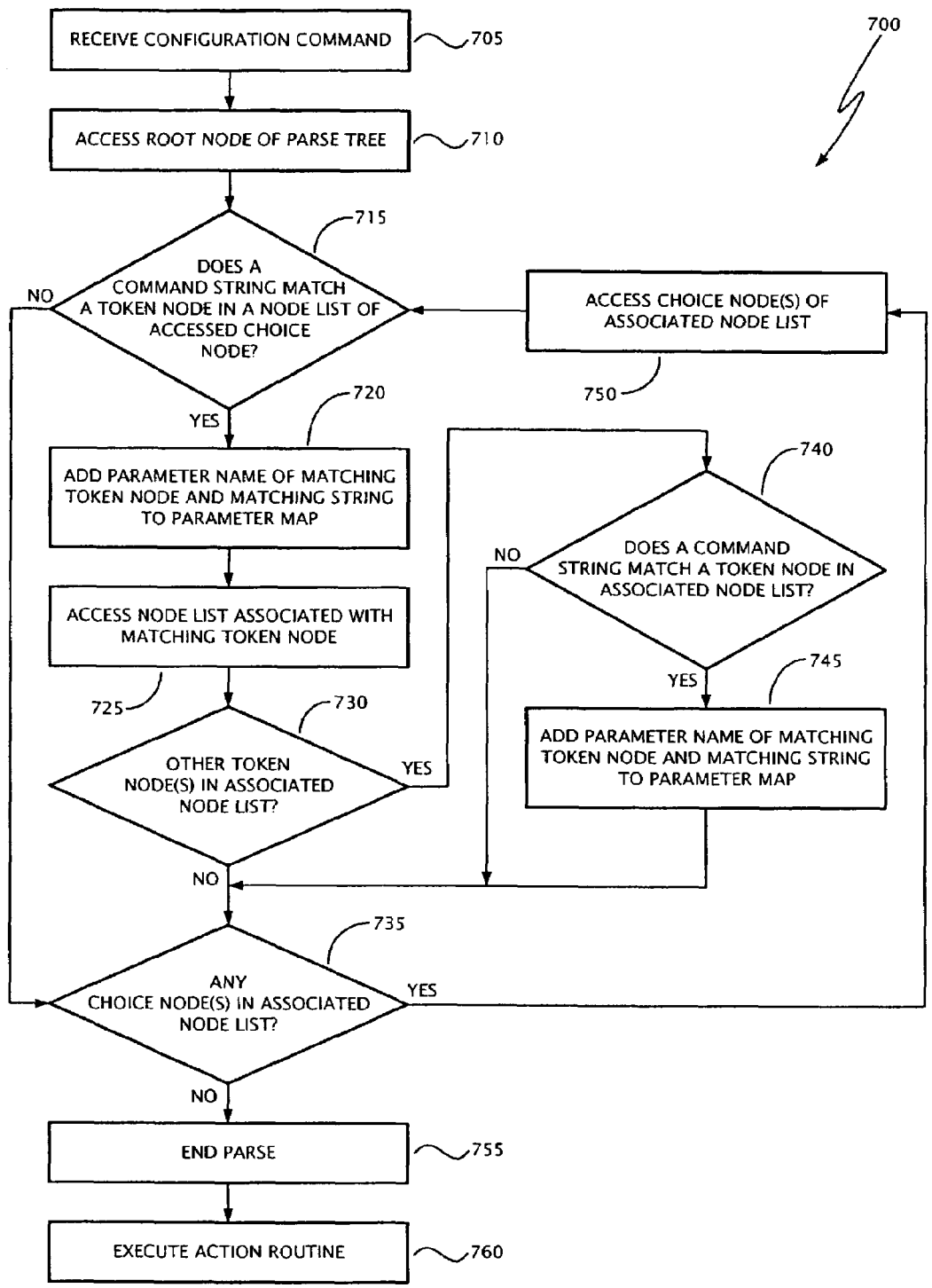
FIG. 7 is a block diagram illustrating an embodiment of a method of parsing a command.

Referring now to FIG. 6, the parse tree 600 comprises a number of "choice nodes" 610 and "token nodes" 620. A choice node 610 represents a choice between two or more possible "node lists" 605. A node list 605 corresponds to a branch of the parse tree 600, and each node list 605 includes a list of one or more token nodes 620 and/or one or more additional choice nodes 610. A token node 620 represents a parameter the parser 360 will search for during a parse operation—i.e., a parser parameter—and each token node includes a search string 621 (e.g., a keyword, a number, an identifier, etc.) corresponding to the parser parameter. A token node 620 may also be annotated with a name 622 of the parser parameter represented by that token node. In addition, a token node 620 may have an action routine 623 associated therewith, wherein the action routine 623 of a token node 620 is executed if a parse operation ends on that token node. The class mappings 500 use these action routines and the parameter map 370 to trigger the appropriate data manipulations which will convert the parser parameters into a form (e.g., object instances and attribute values) that can be integrated into the application data model 310. The action routine 623 will generally comprise one of create object, delete object, modify object, associate object, and dissociate object.

Generally, for a valid input command, each choice node 610 of a parse tree has the property that only a single node list 605 or branch will be the appropriate choice for that choice node 610. In other words, during the parsing of a command 10 received from a network device 110, there should not be two (or more) possible outcomes. Therefore, for a received command 10, there is exactly one path through the parse tree that will parse that command. Also, it should be noted that a node list 605 may have an "empty list" 630, where an empty list represents no tokens. An empty list 630 generally occurs where a command parameter is optional.

To parse a received command 10, the parser 360 "walks" down through the parse tree 600—starting at a first choice node or "root node"—and builds a map 370 of parameters (or token nodes 320) that were encountered. When a branch or node list 605 of the parse tree 600 is accessed, all token nodes 620 and choice nodes 610 in that branch are considered. For each token node 620 encountered during a parse operation, the parameter map 370 includes the parameter name 622 and the string found in the received command 10 that matched the search string 621 of that token node. Thus, the input to the parser 360 is a command 10 and the output of the parser is a parameter map 370 including parameter names 622 and matching input strings. This parameter map 370 may then be passed to an action routine 623—i.e., the action routine associated with the last token node encountered during the parse operation—and the action routine 623 executed. Again, the class mappings 500 use the action routine and the parameter map 370 to trigger the appropriate data manipulations which will convert the parser parameters into a form (e.g., object instances and attribute values) that can be integrated into the application data model 310.

Note that, in FIG. 6, only the first node list 605' of the first choice node (or root node) 610' is shown expanded. It should be understood, however, that such a parse tree 600 may include many node lists 605 underneath the root node 610' and, in practice, a parse tree may include hundreds, or even thousands, of token nodes 620 and choice nodes 610 (as well as node lists 605). It should also be understood that the parse tree 600 illustrated in FIG. 6 is but one example of such a parse tree and, further, that a parse tree may have any suitable configuration.

The above-described parse tree 600 and parser 360 may be better understood by reference to the method 700 of parsing illustrated in FIG. 7, as well as the specific example set forth in FIGS. 8 through 10. Referring to block 705 in FIG. 7, a command 10 is received from a device 110. The parser 360 accesses the root node 610' in the parse tree 600, as shown at block 710. The parser 360 then compares the contents of the command against each node list 605 underneath the root node 610' to determine whether a data string of the command matches a token node 620 in a node list 605, which is illustrated by block 715.

Referring to block 720, if a data string does match a token node 620 in any node list 605, the parameter name 621 of the matching token node and the matching string of the command (i.e., the data string that matched the search string 621 of that token node) are added to the parameter map 370. This is illustrated in FIG. 6 by the highlighted elements. The root node 610' (again, this is the first choice node) has been accessed and a command string was found to match the search string 621 of a token node 620".

As previously noted, when a branch or node list 605 is "opened" (i.e., because a command string matched a token node 620 in that branch), all possible token nodes 620 and/or choice nodes 610 in that branch need to be considered. Thus, as shown at block 725, the node list 605 associated with the matching token node is accessed. Referring to blocks 730 and 735, it is determined whether any other token nodes 620 are present in the "open" node list and, further, whether there are any choice nodes in this node list. This is also illustrated by the highlighted path through the parse tree 600 of FIG. 6. Note that, in FIG. 6, the choice node 610" has also been accessed; however, there were no additional token nodes underneath the open node list 605'.

Referring to block 740, if there are other token nodes 620 in the accessed node list 605, the parser 360 then compares the contents of the command against each of the other token nodes to determine whether a data string of the command matches any of these token nodes. For each matching token node 620, the parameter name 621 of this matching token node and the matching string of the command (i.e., the data string that matched the search string 621 of the token node) are added to the parameter map 370, as illustrated at block 745. If there are any choice nodes 610 in the open node list 605—see block 735—then, for each of these choice nodes, the choice node is accessed—see block 750—and the parse operation continues as described above (see block 715 through 745) for each choice node.

Returning to the example shown in FIG. 6, the choice node 610" underneath the open node list 605' has been accessed and a second node list 605" accessed because a command string matched the search string 621 of a token node 620''' in this branch. The second accessed node list 605" also includes a choice node 610'''. (but no other token nodes), and this choice node 610''' is then accessed. A command string also matched a token node 620'''' associated with a third branch or node list 605''' and the parameter name and matching string corresponding to this token node 620'''' added to the parameter map. The third node list 605''' is opened and two additional choice nodes 610'''' identified underneath this branch. The first of these two choice nodes 610'''' did not include a matching token node 620; however, the second of these choice nodes includes a matching token node. More specifically, a command string matched a token node 620''''' associated with a fourth node list 605'''' and, once again, the parameter name and matching string of this token node 620''''' are added to the parameter map 370. Note that there is a second token node 620''''' underneath the fourth node list 605'''' and this token node needs to be considered. However, the received command does not include a string matching the search string of this second token node.

Returning to FIG. 7, if there are no other token nodes 620 and no choice nodes 610 in the last accessed branch of the parse tree 600 (see blocks 730, 735), the parse operation is complete, as illustrated at block 755. Referring to block 760, the action routine 623 associated with the last encountered token node is then executed. Returning again to the example set forth in FIG. 6, for the fourth node list 605'''', all token nodes and choice nodes, if any (there are no choice nodes associated with the fourth open branch), have been considered and there are no further branches to access. Accordingly, the parse operation is complete and the action routine associated with the last encountered token node (i.e., one of the token nodes 620″″) is executed. Again, the class mappings 500 use such action routines to convert the parser parameters into a form (e.g., object instances and attribute values) that can be integrated into the application data model 310.

In summary, as illustrated by the highlighted example in FIG. 6, when performing the method of parsing 700 in parser 360, the parser 360 "walks" through the parse tree 600 to identify all token nodes 620—and, hence, the parameter name 622 and matching command string—for which the received command includes a corresponding parameter. Thus, a received command 10 is parsed to identify all parameters of interest, and these parameters may then be provided to the class mappings 500 and application data model 310.

Illustrated in FIG. 8 is a parse tree 800 (or a portion of a parse tree) that may be used to parse the command 900 shown in FIG. 9. A string 901 (i.e., "enable") of the command line 900 matches a search string (i.e., "enable") of a token node (line 803) of the parse tree 800. The matching token node (line 803) is annotated with a parameter name (i.e., "_boolean"), and the parameter name and matching string are added to a parameter map 1000, as shown in FIG. 10 (line 1001).

The matching token node (line 803) is associated with a node list or branch (line 802), and all other token nodes and choice nodes in this branch need be considered. There is one choice node (line 804), and a node list (line 809) of this choice node includes a token node (line 810) for which the command 900 has a string 902 (i.e., "telnet") that matches the search string (i.e., "telnet") of the token node. All other token nodes and choice nodes of this node list (line 809) are also considered.

A command string 903 (i.e., "access-profile") matches the search string (i.e., "access-profile") of a token node (line 813) of the open branch, and the corresponding node list (line 812) is accessed. All other token nodes and choice nodes in the newly opened branch are then considered. There are two choice nodes (lines 814 and 819) in this branch. A token node (line 818) of the first of these choice nodes includes a search string (i.e., "<name>") that has a corresponding string 904 (i.e., "foo") in the command line 900. This token node (line 818) is annotated with a parameter name (i.e., _telnetAccessProfile), and the parameter name and matching string are added to the parameter map 1000 (line 1002).

The second choice node (line 819) in the open node list (line 812) also includes a token node (line 823) for which the command line 900 includes a string 905 (i.e., "port") that matches the search string (i.e., "port") of this token node. The node list (line 822) associated with this token node (line 823) is accessed and all other token nodes and choice nodes in this branch are considered. In this node list (line 822), there is another token node (line 824), and this token node includes a search string (i.e., "<unsigned>") that corresponds to a data string 906 (i.e., "23") in the command line 900. Also, this token node (line 824) is annotated with a parameter name (i.e., "_telnetPort"), and this parameter name and the matching data string are added to the parameter map 1000 (line 1003).

The last encountered token node (line 824) has an action routine associated therewith (denoted by the "*" notation), and this action routine is executed, as described above. Note that several of the token nodes have associated action routines, which indicates that any of these token nodes is a valid place to end a parse routine.

Returning to FIGS. 4 and 6, a unique feature of the parser 360 is that it is reversible. As noted above, each choice node of a parse tree has the property that, for a valid input command, only a single node list or branch of the tree will be the appropriate choice for that choice node, such that there is exactly one path through the parse tree that will parse the input command. Thus, as a result of this property, if the parser is provided with a map of parameter values, a command template, plus a "hint" as to which parameters are required and which are desired, the parser 360 can "walk" down through the parse tree beginning at the root node to find all possible paths that match the command template. The parser can then analyze the possible paths to see which one most closely matches the parameters specified in the input parameter map, and then generate a command from the best matching path and the given parameters.

Figure 11:
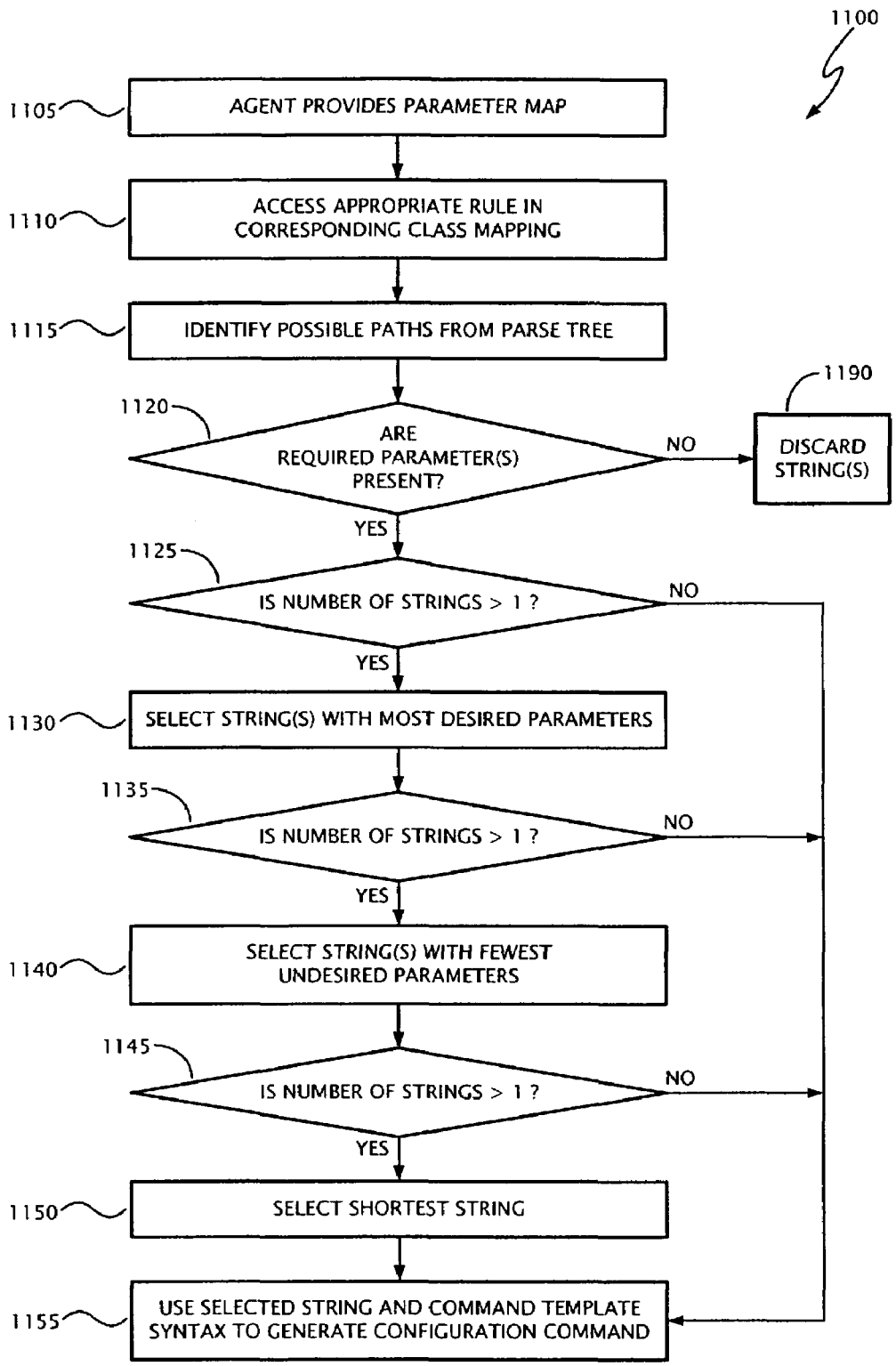
FIG. 11 is a block diagram illustrating an embodiment of a method of reconstructing a command.

A method 1100 of generating a command (i.e., a method of reverse parsing) is illustrated in FIG. 11. Referring to block 1105 in FIG. 11, the management agent 300 provides a parameter map 370. The appropriate class mapping 500 is then accessed to search for a corresponding rule 520, as shown at block 1110. This rule 520 will include a command template 526. Parser 360 then reconstructs the possible commands from the parse tree 600 by identifying the possible paths through the parse tree, which is illustrated at block 1115.

Referring to block 1120, for each possible command (or path) it is then determined whether the required parameters are present. Generally, a required parameter corresponds to a key attribute. For example, a key attribute of an object instance is the name of the object instance. If a possible command does not include the required parameter (or parameters), that path is discarded, as shown at block 1190.

Referring to block 1125, after discarding those paths that do not encompass the required parameter(s), if only one possible command string remains, that command string is selected and used, along with the command template, to generate a command having the appropriate syntax, which is illustrated at block 1155. However, if multiple possible paths remain after discarding those without the required parameter(s), then the possible commands with the most desired parameters are chosen, as shown at block 1130. Generally, a desired parameter comprises an optional parameter that has been modified by the management agent 300 or an optional parameter with a default value where this value is not set to the default.

Referring to block 1135, after selecting those paths having the most desired parameters, if only one possible command string remains, that command string is selected and used, along with the command template, to generate a command having the appropriate syntax. Again, this is illustrated at block 1155. However, if multiple paths remain after selecting those paths having the most desired parameters, then the possible commands with the fewest undesired parameters are selected, as shown at block 1140. Generally, an undesired parameter comprises an optional parameter that has not been modified by the management agent 300.

With reference to block 1145, after selecting those paths having the fewest undesired parameters, if only one possible command string remains, this command string is selected. If, however, multiple possible paths remain after selecting those paths having the fewest undesired parameters, then the shortest possible command string is selected, which is illustrated at block 1150. Once again, as illustrated by block 1155, the selected command string and command template are used to generate a command having the appropriate syntax (e.g., for a network device 110).

Thus, using the method 1100 of generating a command, the parser 360 can receive a map of parameters and search all possible paths through the parse tree 600 to determine which provides the best command. A command template plus a list of required, desired, and undesired parameters— i.e., the "hints"—are used to select the best command line from all possible paths in the parse tree 600. By way of example, consider the parameter map 1000 set forth in FIG. 10 and the parse tree 800 of FIG. 8. To reconstruct the command line 900 (i.e., "enable telnet access-profile foo port 23") from the parameter map 1000, the parser 360 would consider all possible paths through the parse tree 800. In this case, the command template would be "enable telnet", and the parameter name (i.e., "_boolean", which in this instance, is set to "enable") is a required parameter. Knowing that "_telnetAccessProfile" and "_telnetPort" are desired parameters, the parser can select the one path through the parse tree 800 that includes the required parameters and the most desired parameters to reconstruct the command (note that the token nodes of the selected path are underlined in FIG. 8). In this example, when reconstructing the above command, there will generally be two possible command templates—i.e., one for "enable telnet" and one for "disable telnet"—and the appropriate choice of command template is determined by the "_boolean" parameter.

The disclosed embodiments may be better understood with reference to the following example. Consider the commands "create vlan blue"; "configure vlan blue tag 145"; "configure vlan blue add ports 1:10"; and "delete vlan blue". Assume for this example that the application data model 310 includes a data class 320 having "VLAN" objects to represent VLANs and a parent object "VLANFolder" to contain the VLANs. A rule set 1210 for this data class is shown in FIG. 12, wherein the rule set includes four rules 1220*a*, 1220*b*, 1220*c*, and 1220*d* (corresponding to create, update, relate, and delete, respectively).

Figures 12, 13A:
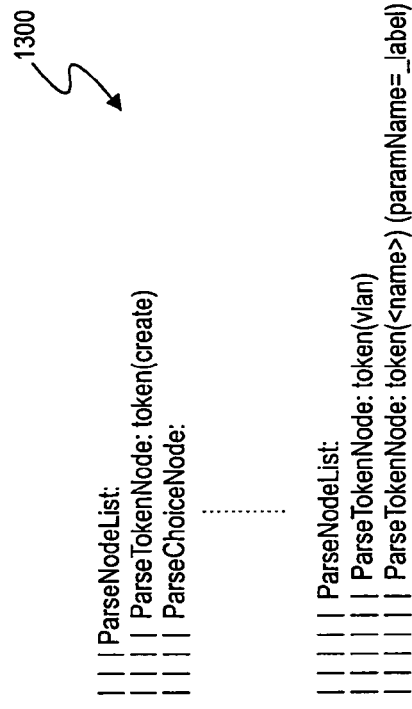

Using a portion of a parse tree 1300 shown in FIG. 13A, the first command—i.e., "create vlan blue"—can be parsed in parser 360 to create the parameter map "_label=blue" and an action routine is executed to find the appropriate mapping. The logic 550 is invoked to find the parent object VLANFolder. The logic 540 then creates a new VLAN object in the VLANFolder and sets the "_label" attribute of the new VLAN to "blue" (the conversion between the parser parameter "blue" and the object attribute "_label" having been performed by logic 560).

Using another portion of the parse tree 1300 shown in FIG. 13B, the commands "configure vlan blue tag 145" and "configure vlan blue add ports 1:10" can be parsed. The parameter map for "configure vlan blue tag 145" is "_label=blue, _vlanTag=145". Again, an action routine is executed to find the appropriate mapping. The logic 540 is invoked to search the VLANFolder to find a VLAN object whose label is "blue", and the "_vlanTag" attribute of VLAN blue is set to "145" (the conversion between the parser parameter "145" and the object attribute "_vlanTag" having been performed by logic 560).

The parameter map for "configured vlan blue add ports 1:10" is "_label=blue, _ports=1:10". During execution of the corresponding action routine, the logic 540 is invoked to search the VLANFolder to find a VLAN object whose label is "blue", and the "_ports" attribute of VLAN-blue is set to "1:10" (the conversion between parser parameter "1:10" and the object attribute "_ports" having been performed by logic 560). The action routine would also add or relate a "Port" object to the VLAN object.

Figure 13C:
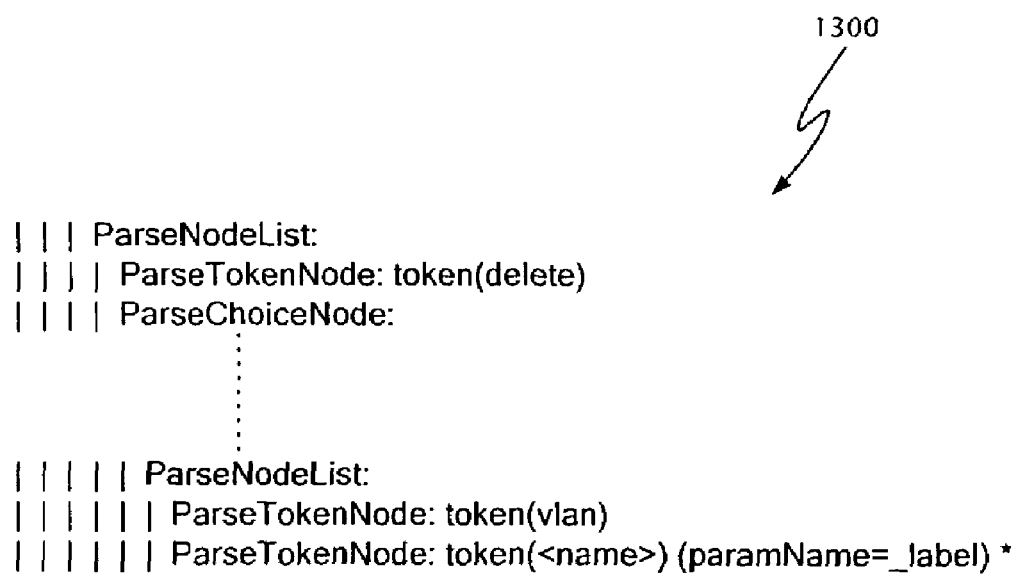

Another portion of the parse tree 1300 is shown in FIG. 13C, and this portion of the parse tree may be used to parse the command "delete vlan blue". The parameter map for this command is "_label=blue". During execution of the corresponding action routine, the logic 540 is invoked to search the VLANFolder for a VLAN object having the label "blue", and the VLAN blue is deleted from the VLANFolder.

Now consider how the above-noted commands could be reconstructed from their respective parameter maps and the parse tree 1300. The parameter map for the command "create vlan blue" is "_label=blue", and the management agent 300 would provide this parameter map to the parser 360. The parser would locate the "create" rule 1220*a* (see FIG. 12) in the class mapping. The logic 530 would be invoked to convert the object instance to parser parameters (i.e., _label=blue). The parser 360 then takes the command template "create vlan <name>" and walks down the parse tree 1300 to reconstruct the command string "create vlan blue". Note that the vlan name (in this case, the name "blue") is a required parameter (see FIG. 11).

The parameter map for the command "configure vlan blue tag 145" is "_label=blue, _vlanTag=145", and the management agent 300 would provide this parameter map to parser 360. The parser 360 would locate the "update" rule 1220*b* (see FIG. 12) in the class mapping, and the logic 530 is invoked to convert the object instances to parser parameters. The parser parameters are set as follows: _label=blue, _vlanTag=145. The parser 360 uses the command template "configure vlan <name> tag <number>" and the parse tree 1300 to reconstruct the command string "configure vlan blue tag 145". The vlan name (in this case, "blue") is a required parameter, whereas the tag number is a desired parameter.

For the command "configure vlan blue add ports 1:10", the parameter map is "_label=blue, _ports=1:10". The management agent 300 would, once again, provide this parameter map to the parser 360. The parser 360 would locate the "relate" rule 1220*c* (see FIG. 12) in the class mapping, and the logic 530 is invoked to convert the object instances to parser parameters, and the parser parameters are set as "_label=blue, _ports=1:10". The parser 360 uses the command template "configure vlan <name> add ports <port>" and the parse tree 1300 to reconstruct the command string "configure vlan blue add ports 1:10". The vlan name (in this case, "blue") is a required parameter, whereas the port is a desired parameter.

The parameter map for the command "delete vlan blue" is "_label=blue", and the management agent 300 would provide this parameter map to the parser 360. The parser would locate the "delete" rule 1220*d* (see FIG. 12) in the class mapping. The logic 530 would be invoked to convert the object instance to parser parameters (i.e., _label=blue). The parser 360 then takes the command template "delete vlan <name>" and walks down the parse tree 1300 to reconstruct the command string "delete vlan blue". Note that the vlan name (in this case, the name "blue") is, again, a required parameter.

In another embodiment, two application data models for a device may be compared to determine what changes have occurred (e.g., what objects have changed), and the detected changes fed to the reversible parser 360 to generate a sequence of commands. For example, an "after modification" data model may be compared with a "before modification" application data model to determine any differences. If changes are found, these changes may be used to generate a sequence of commands that, when provided to the device, configured the device from a "before modification" state to an "after modification" state.

Figure 14:
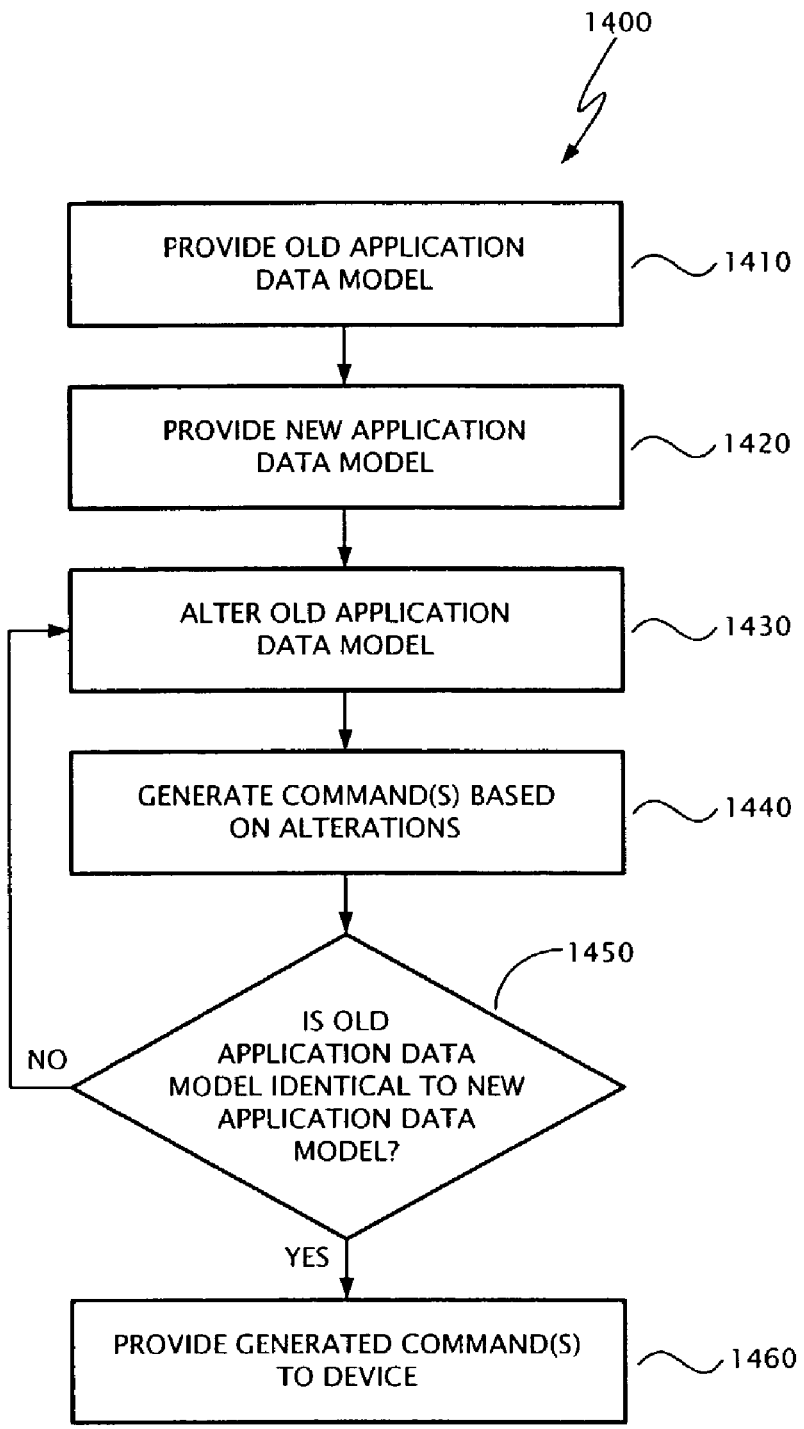
FIG. 14 is a block diagram illustrating an embodiment of a method of comparing two application data models.

Illustrated in FIG. 14 is an embodiment of such a method 1400 of comparing two application data models. Referring to block 1410 in FIG. 14, an old application data model is provided for a device and, in block 1420, a new application data model is provided for the device. Using a series of manipulations, the old application data model is altered into a form identical to that of the new application data model, as shown at block 1430. The manipulations may include create object, delete object, update object, associate object, and dissociate object.

Referring now to block 1440, commands are generated in response to the alterations or manipulations of the old data model. The commands may be reconstructed by the reversible parser 360 in a manner similar to that described above. When the old application data model is identical to the new application data model—see block 1450—the process is complete and the generated commands may be provided to the device, as illustrated at block 1460. It should be understood that the generated commands may be provided at any time—e.g., as each is created—during the manipulation of the old application data model (although the device itself, as explained below, may dictate the order in which the commands can be provided to the device).

Generally, the generated commands should be provided to the device in a sequence that the device will accept. In one embodiment, a default algorithm for determining this command sequence comprises three phases that are applied in order. In the first phase, for child objects under the current object that are present in the "before" model but absent in the "after" model, the objects are deleted. Next, for any value attributes that are different in the current object between the "before" and "after" models, the value in the "after" model is modified to match the "before" model. Subsequently, for any child object under the current object that are absent in the "before" model but present in the "after" model, the object is created. For each child object under the current object in both the "before" and "after" models, this series of operations is then applied to each pair of matching "before" and "after" child objects. In the second phase, for each non-child relationship where a target object is associated with the current object in the "before" model but not associated in the "after" model, the target object is dissociated from the current object. For each non-child object under the current object in both the "before" and "after" models, this operation is applied to each pair of matching "before" and "after" child objects. In the third phase, for each non-child relationship where a target object is not associated with the current object in the "before" model but is associated in the "after" model, the target object is associated with the current object. Again, for each non-child object under the current object in both the "before" and "after" models, this operation is applied to each pair of matching "before" and "after" child objects.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method to manipulate a data object with a command comprising:
   receiving the command, wherein the received command compromises one or more data strings;
   accessing a parse tree, wherein the parse tree comprises at least one choice node, wherein each choice node has directly subordinate at least two node lists, wherein each node list has directly subordinate at least one token node, the parse tree having a property wherein only a single path through the parse tree corresponds to the received command;
   parsing the received command to identify the single path;
   selecting an operation using the parsed command, the operation to manipulate the data object; and
   performing the operation.

2. The method of claim 1 wherein parsing comprises:
   sequentially accessing choice nodes beginning with the parse tree root node, wherein accessing a choice node comprises accessing a node list directly subordinate to the choice node that has directly subordinate to the node list at least one matching token node, wherein each matching token node possesses a search string that matches a received command data string, wherein accessing a node list comprises first accessing any matching token node directly subordinate to the node list, then accessing any choice nodes directly subordinate to the node list; and
   terminating parsing when a terminus of the parse tree is reached, wherein the terminus of the parse tree is reached when a node list has been accessed, any matching token nodes directly subordinate to the accessed node list have been accessed and there are no choice nodes directly subordinate to the accessed node list.

3. A method to manipulate a data object with a command comprising:
   parsing the command, including selecting an operation and generating a parameter map comprising one or more parameters, each comprising a name and a value;
   selecting a rule set associated with a set of operations to manipulate data objects belonging to a class of objects, the data objects including the data object, the operations including the operation, the rule set comprising a list of object attributes names associated with the operation, the rule set comprising a conversion logic to generate object attributes for any of the operations in the set;
   generating an object attribute value for one of the object attribute names using the conversion logic and the parameter map; and
   performing the operation using the object attribute value.

4. The method of claim 3, wherein generating the object attribute value for one of the object attribute names using the conversion logic and parameter map further comprises:
   performing a translation procedure;
   if the translation procedure fails to generate the object attribute, performing an implicit mapping procedure; and
   if the implicit mapping procedure fails to generate the object attribute, performing an absent value procedure.

5. The method of claim 4, wherein generating the object attribute value for one of the object attribute names using the conversion logic and parameter map further comprises:
   if the absent value procedure fails to generate the object attribute, performing a custom procedure.

6. The method of claim 4, wherein performing the translation procedure further comprises:
  if the rule set includes an attribute mapping that links the object attribute name with one of the parameter names in the parameter map,
    then translating a parameter value associated with the linked parameter name into the object attribute value using the attribute mapping,
    else the translation procedure fails; and
  wherein performing the implicit mapping procedure further comprises:
  if one of the parameter names in the parameter map matches the object attribute name,
    then assigning a parameter value associated with the matched parameter name as the object attribute value,
    else the implicit mapping procedure fails.

7. The method of claim 4, wherein performing the absent value procedure further comprises:
  if a default value for the object attribute exists in the rule set,
    then assigning the default value to the object attribute value,
    else the absent value procedure fails.

8. A method to generate a command related to an operation comprising:
  providing a command template associated with the operation, comprising one or more data strings;
  providing a parameter map, the parameter map with one or more command parameters, each parameter with a name and a value;
  providing a hint list designating a portion of the parameters as required, a portion of the parameters as desired, and a portion of the parameters as undesired;
  generating one or more potential commands by parsing the command template to find paths through a parse tree that parse the command template, substituting a parameter value from the map for a one of the data strings in the command template when the associated parameter name is encountered in a path; and
  selecting one of the potential commands as the generated command by screening for potential commands with all required parameters, then screening for potential commands with a greatest number of desired parameters, then screening for potential commands with fewest undesired parameters, then screening for a shortest potential command.

9. The method of claim 8,
  wherein screening for potential commands with all required parameters further comprises selecting the one potential command with all the required parameters if there is only one potential command with all the required parameters, else discarding all potential commands without all the required parameters;
  wherein screening for potential commands with a greatest number of desired parameters further comprises selecting the undiscarded potential command with the greatest number of desired parameters if there is only one undiscarded potential command with the greatest number of desired parameters, else discarding all undiscarded potential commands with fewer desired parameters than one of the undiscarded commands with the greatest number of desired parameters;
  wherein screening for potential commands with fewest undesired parameters further comprises selecting the undiscarded potential command with the fewest undesired parameters if there is only one undiscarded potential command with the fewest undesired parameters, else discarding all potential commands with a greater number of undesired parameters than one of the undiscarded potential commands with the fewest undesired parameters; and
  wherein screening for the shortest potential command further comprises selecting the shortest undiscarded potential command.

10. A method to generate a command corresponding to operation on a data object comprising:
  providing an object attribute related to the operation, the object attribute having a name and a value;
  selecting a rule set associated with a set of operations to manipulate data objects belonging to a class of objects, the data objects including the data object, the operations including the operation, the rule set comprising command templates, each command template comprising one or more data strings, each command template associated with one of the operations, the rule set comprising a conversion logic to generate command parameters for any of the command templates in the rule set;
  generating a parameter map using the conversion logic and the object attribute, the parameter map comprising command parameters, each parameter with a name and a value;
  selecting one of the command templates associated with the operation;
  providing a hint list designating a portion of the parameters as required, a portion of the parameters as desired, and a portion of the parameters as undesired;
  generating one or more potential commands by parsing the selected command template to find paths through a parse tree that parse the command template, substituting a parameter value from the map for a one of the data strings in the command template when the associated parameter name is encountered in a path; and
  selecting one of the potential commands as the generated command by screening for potential commands with all required parameters, then screening for potential commands with a greatest number of desired parameters, then screening for potential commands with fewest undesired parameters, then screening for a shortest potential command.

11. The method of claim 10, wherein generating the parameter map using the conversion logic and the object attribute further comprises:
  performing a translation mapping procedure to generate a parameter associated with the object attribute,
  if the translation mapping procedure fails to generate a parameter, performing an implicit mapping procedure;
  adding the parameter to the parameter map; and
  performing an absent value mapping procedure.

12. The method of claim 11, wherein performing the translation mapping procedure further comprises:
  if the rule set includes an attribute mapping that links the object attribute name with an associated parameter name,
    then converting the object attribute into the parameter value using the attribute mapping and designating the object attribute name as the parameter name,
    else the translation mapping procedure fails;
  wherein performing the implicit mapping procedure further comprises:
    passing without modification the object attribute value associated with the parameter name to the parameter value, and designating the object attribute name as the parameter name; and wherein performing the absent value mapping procedure further comprises:

if a default value for the parameter value exists in the rule set that matches the parameter value, then removing the parameter from the parameter map.

13. An apparatus manipulate a data object with a command comprising:

a parser, to parse the command, to select an operation related to the parsed command and to generate a parameter map comprising one or more parameters parsed from the command, each parameter comprising a name and a value;

a rule set associated with a set of operations to manipulate data objects belonging to a class of objects, the data objects including the data object, the operations including the operation, the rule set comprising a list of object attributes names associated with the operation, the rule set comprising a conversion logic to generate object attributes for any of the operations in the set;

a command generator, coupled with the parser and the rule set, to generate an object attribute value for one of the object attribute names using the conversion logic and the parameter map; and a management agent, coupled with the command generator to perform the operation using the object attribute value.

14. The apparatus of claim 13, wherein the conversion logic further comprises:

a translation procedure;

an implicit mapping procedure to be performed if the translation procedure fails to generate the object attribute; and an absent value procedure to be performed if the implicit mapping procedure fails to generate the object attribute.

15. The apparatus of claim 14, wherein the conversion logic further comprises:

a custom procedure to be performed if the absent value procedure fails to generate the object value.

16. An article of manufacture comprising a machine-readable medium including data that, when read by a machine, cause the machine to perform operations comprising:

parsing the command, including selecting an operation and generating a parameter map comprising one or more parameters, each comprising a name and a value;

selecting a rule set associated with a set of operations to manipulate data objects belonging to a class of objects, the data objects including the data object, the operations including the operation, the rule set comprising a list of object attributes names associated with the operation, the rule set comprising a conversion logic to generate object attributes for any of the operations in the set;

generating an object attribute value for one of the object attribute names using the conversion logic and the parameter map; and performing the operation using the object attribute value.

17. The article of manufacture of claim 16, wherein generating the object attribute value for one of the object attribute names using the conversion logic and parameter map further comprises:

performing a translation procedure;

if the translation procedure fails to generate the object attribute, performing an implicit mapping procedure; and if the implicit mapping procedure fails to generate the object attribute, performing an absent value procedure.

18. The method of claim 17, wherein generating the object attribute value for one of the object attribute names using the conversion logic and parameter map further comprises:

if the absent value procedure fails to generate the object attribute, performing a custom procedure.

19. The article of manufacture of claim 17, wherein performing the translation procedure further comprises:

if the rule set includes an attribute mapping that links the object attribute name with one of the parameter names in the parameter map, then translating a parameter value associated with the linked parameter name into the object attribute value using the attribute mapping, else the translation procedure fails; and wherein performing the implicit mapping procedure further comprises:

if one of the parameter names in the parameter map matches the object attribute name, then assigning a parameter value associated with the matched parameter name as the object attribute value, else the implicit mapping procedure fails.

20. The article of manufacture of claim 17, wherein performing the absent value procedure further comprises:

if a default value for the object attribute exists in the rule set, then assigning the default value to the object attribute value, else the absent value procedure fails.

21. An article of manufacture comprising a machine-readable medium including data that, when read by a machine, cause the machine to perform operations comprising:

providing a command template associated with the operation, comprising one or more data strings;

providing a parameter map, the parameter map with one or more command parameters, each parameter with a name and a value;

providing a hint list designating a portion of the parameters as required, a portion of the parameters as desired, and a portion of the parameters as undesired;

generating one or more potential commands by parsing the command template to find paths through a parse tree that parse the command template, substituting a parameter value from the map for a one of the data strings in the command template when the associated parameter name is encountered in a path; and selecting one of the potential commands as the generated command by screening for potential commands with all required parameters, then screening for potential commands with a greatest number of desired parameters, then screening for potential commands with fewest undesired parameters, then screening for a shortest potential command.

22. The article of manufacture of claim 21, wherein generating the parameter map using the conversion logic and the object attribute further comprises:

performing a translation mapping procedure to generate a parameter associated with the object attribute, if the translation mapping procedure fails to generate a parameter, performing an implicit mapping procedure;
adding the parameter to the parameter map; and
performing an absent value mapping procedure.

23. The article of manufacture of claim 22,
wherein performing the translation mapping procedure further comprises:
if the rule set includes an attribute mapping that links the object attribute name with an associated parameter name,
then converting the object attribute into the parameter value using the attribute mapping and designating the object attribute name as the parameter name,
else the translation mapping procedure fails;
wherein performing the implicit mapping procedure further comprises:
passing without modification the object attribute value associated with the parameter name to the parameter value, and
designating the object attribute name as the parameter name; and
wherein performing the absent value mapping procedure further comprises:
if a default value for the parameter value exists in the rule set that matches the parameter value, then removing the parameter from the parameter map.

24. An article of manufacture comprising a machine-readable medium including data that, when read by a machine, cause the machine to perform operations comprising:
providing an object attribute related to the operation, the object attribute having a name and a value;
selecting a rule set associated with a set of operations to manipulate data objects belonging to a class of objects, the data objects including the data object, the operations including the operation, the rule set comprising command templates, each command template comprising one or more data strings, each command template associated with one of the operations, the rule set comprising a conversion logic to generate command parameters for any of the command templates in the rule set;
generating a parameter map using the conversion logic and the object attribute, the parameter map comprising command parameters, each parameter with a name and a value;
selecting one of the command templates associated with the operation;
providing a hint list designating a portion of the parameters as required, a portion of the parameters as desired, and a portion of the parameters as undesired;
generating one or more potential commands by parsing the selected command template to find paths through a parse tree that parse the command template, substituting a parameter value from the map for a one of the data strings in the command template when the associated parameter name is encountered in a path; and
selecting one of the potential commands as the generated command by screening for potential commands with all required parameters, then screening for potential commands with a greatest number of desired parameters, then screening for potential commands with fewest undesired parameters, then screening for a shortest potential command.

* * * * *